United States Patent
Saffra

(10) Patent No.: US 8,220,923 B2
(45) Date of Patent: Jul. 17, 2012

(54) EYEGLASS FRAME SIZING SYSTEMS AND METHODS

(76) Inventor: Norman Saffra, Lawrence, NY (US)

( * ) Notice: Subject to any disclaimer, the term of this patent is extended or adjusted under 35 U.S.C. 154(b) by 0 days.

(21) Appl. No.: 13/068,181

(22) Filed: May 4, 2011

(65) Prior Publication Data

US 2011/0273665 A1 Nov. 10, 2011

Related U.S. Application Data

(62) Division of application No. 12/799,926, filed on May 5, 2010, now Pat. No. 7,959,287.

(51) Int. Cl.
*A61B 3/10* (2006.01)
*A61B 3/00* (2006.01)

(52) U.S. Cl. ......................... 351/204; 351/246
(58) Field of Classification Search ........... 351/200–246
See application file for complete search history.

(56) References Cited

U.S. PATENT DOCUMENTS

| 955,333 | A | 4/1910 | Hill |
|---|---|---|---|
| 980,070 | A | 12/1910 | Cowan |
| 1,002,580 | A | 9/1911 | Griffin |
| 2,337,866 | A | 12/1943 | Boughton et al. |
| 2,835,161 | A | 5/1958 | Williams |
| 4,448,501 | A | 5/1984 | Cogez |
| 4,561,739 | A | 12/1985 | Okazaki |
| 4,997,267 | A | 3/1991 | Morrison et al. |
| 5,187,503 | A | 2/1993 | Hilton |
| 5,280,570 | A | 1/1994 | Jordan |
| 5,355,184 | A | 10/1994 | Varveris et al. |
| 5,402,109 | A | 3/1995 | Mannik |
| 5,499,063 | A | 3/1996 | Butler et al. |
| 5,515,268 | A | 5/1996 | Yoda |
| 5,546,198 | A | 8/1996 | Van der Gracht et al. |
| 5,694,194 | A * | 12/1997 | Morrison ............ 351/128 |
| 5,926,247 | A | 7/1999 | Kimura |
| 5,983,201 | A | 11/1999 | Fay |
| 6,508,553 | B2 | 1/2003 | Gao et al. |
| 6,554,422 | B2 | 4/2003 | Bell |
| 6,682,195 | B2 | 1/2004 | Dreher |
| 6,698,882 | B1 | 3/2004 | Wu |
| 7,347,551 | B2 * | 3/2008 | Fergason et al. ........... 351/210 |
| 7,591,555 | B1 | 9/2009 | Chen |
| 2001/0001246 | A1 | 5/2001 | Ono et al. |
| 2002/0003603 | A1 | 1/2002 | Bullard, Jr. |
| 2008/0198328 | A1 | 8/2008 | Seriani et al. |
| 2009/0033862 | A1 | 2/2009 | Margolis |
| 2009/0051871 | A1 | 2/2009 | Warden et al. |
| 2009/0105605 | A1 | 4/2009 | Abreu |
| 2009/0231544 | A1 | 9/2009 | Mahloch |
| 2010/0033673 | A1 | 2/2010 | Le Duy |

* cited by examiner

*Primary Examiner* — Mohammed Hasan
(74) *Attorney, Agent, or Firm* — Richard F. Jaworski

(57) ABSTRACT

An eyeglass frame sizing system includes a frame member, a pair of adjustable rims supported by the frame member, each rim including an indicator for indicating a center of the rim, an adjustable nosepiece supported by the frame member, a pair of adjustable temples each supported by one of the pair of rims and a plurality of sensors for detecting positions of the pair of adjustable rims, the pair of adjustable temples and the adjustable nosepiece.

8 Claims, 5 Drawing Sheets

EYEGLASS FRAME SIZING SYSTEMS AND METHODS

The present application is a divisional of application Ser. No. 12/799,926 filed May 5, 2010 Now U.S. Pat. No. 7,959,287 entitled EYEGLASS FRAME SIZING SYSTEMS AND METHODS, now allowed, and the entire contents of which are incorporated herein by reference.

BACKGROUND

1. Technical Field

The present disclosure relates to eyeglass frames and, more particularly, to eyeglass frame sizing systems and methods.

2. Description of the Background Art

A computerized method for fitting eyeglasses is described in U.S. Pat. No. 5,592,248. A digital camera is used to take a series of digital images of selected portions of a subject's head. The images are displayed on a computer screen and using a scaling and measuring capable program, measurements of the head are taken. These measurements may include the distance between the two pupils and the height at which the optical center or multifocal portion should be positioned relevant to the frame being used. Additional measurements may be taken including the length of the temple, the amount of curve that should be applied to fit comfortably around the patient's ear, the angle of the plane of the front of the eyeglasses in respect to the front of the face, etc. However, such a system requires the use of specialized equipment such as a digital camera, special software for scaling and measuring, etc. and is not in the realm of most individuals. These systems do not allow a customized fit of a set of eyeglasses to an individual's facial characteristics as well as proper custom placement of the lens within the frame.

Various types of adjustable "trial frames" presently exist. However, these trial frames are generally directed at providing a convenient way to hold one or more lenses in place so that a patient can be tested for the proper lens prescription. Although these trial frames provide ways of adjusting the distance for different pupil distances and temple length, there is no way to effectively provide that information in a usable and convenient form to the user for use in selecting a suitable frame.

Generally, different frame manufactures use different standards (if any) for noting the dimensions of their frames. Accordingly, although a salesman at an eyeglass point of sale counter may know which frames tend to be wider or narrower and/or have different temple lengths, they is no universal system for providing such information to the consumer in a meaningful way. Moreover, the user is essentially left with a hit or miss proposition when it comes to selecting a frame that is both aesthetically pleasing to them as well as suitably sized for them.

SUMMARY

This application describes tools (in the form of systems and methods) for eyeglass frame sizing systems and methods.

An eyeglass frame system includes a frame member, a pair of adjustable rims supported by the frame member, each rim including at least one indicator for locating a center of a wearer's pupil, an adjustable nosepiece supported by the frame member, a pair of adjustable temples each supported by one of the pair of rims and a plurality of sensors for detecting positions of the pair of adjustable rims, the pair of adjustable temples and the adjustable nosepiece.

Also disclosed is a method for sizing an eyeglass frame to an individual, comprising adjusting an eyeglass frame sizing system as described herein to fit an individual, causing the eyeglass frame sizing system to detect the positions of the pair of adjustable rims, the pair of adjustable temples and the adjustable nosepiece to obtain measurement information, communicating the measurement information to a computer system and using the computer system to query a database to find eyeglass frames having measurements within a predetermined range of the measurement information.

A disposable eyeglass frame sizing system, comprises a frame member, a pair of adjustable rims supported by the frame member, each rim including an indicator for indicating a center of the rim, an adjustable nosepiece supported by the frame member and a pair of temples each supported by one of the pair of rims, wherein the frame member, the pair of adjustable rims, the adjustable nosepiece and the pair of temples are each made from a disposable material selected from the group including paper and cardboard.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The following exemplary embodiments are set forth to aid in an understanding of the subject matter of this disclosure, but are not intended, and may not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1A:
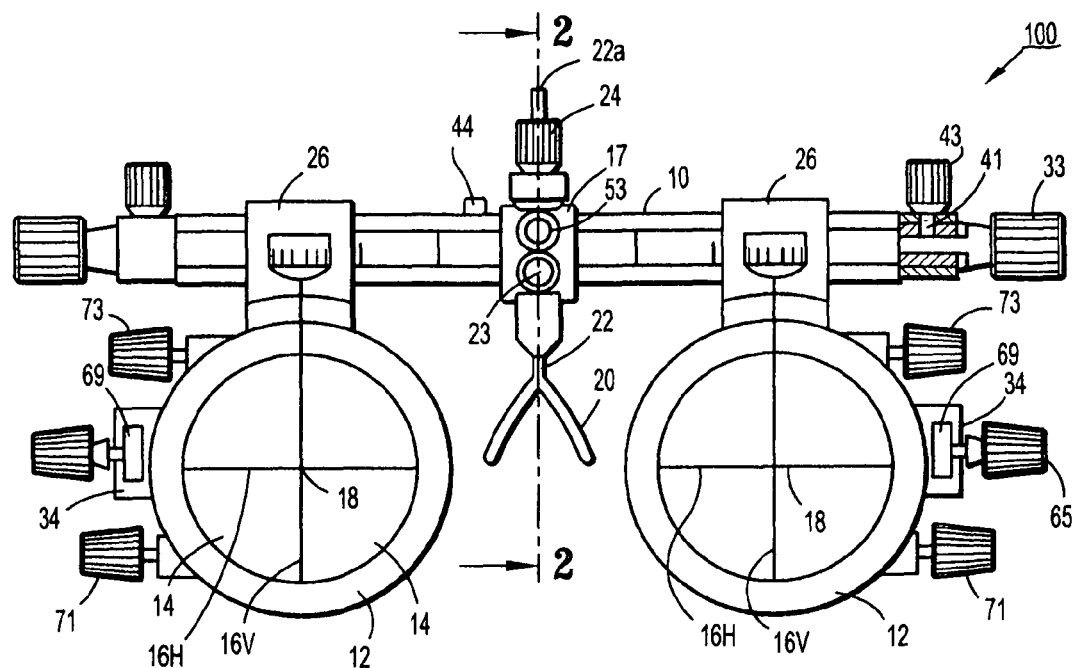
FIG. 1A is a front view of an eyeglass frame measuring system according to an embodiment of the present disclosure.

An embodiment of the present disclosure is shown in FIG. 1A and is referred to generally as measuring device 100.

Measuring device 100 includes a frame 10 having an adjustable nosepiece, a pair of adjustable lens rims and a pair of adjustable temples. Each lens rim 12 may or may not hold a clear lens element 14 having one or more adjustable centering lines associated therewith as shown. For example, each lens rim includes an adjustable horizontal centering line 16H slidably mounted thereon and which is connected to an adjust knob 71. Horizontal centering line 16H is capable of moving up and down (as seen in FIG. 1A) by turning adjust knob 71 clockwise or counter clockwise. An adjustable vertical centering line 16V is also slidably mounted to each lens rim and is connected to an adjust knob 73. Vertical centering line 16V is capable of moving left and right (as seen in FIG. 1) by turning adjust knob 73 clockwise or counter clockwise. The centering lines 16V, 16H adjust so that the center of the wearer's pupil can be located for proper placement and alignment of the lens in the frame. This arrangement thus provides accurate centering of the rims 12 over the eye and also allows accurate centering of the lens within the frame.

Figure 1B:
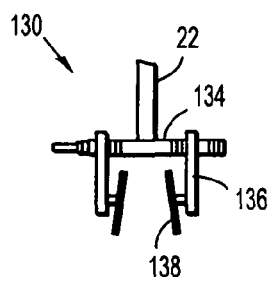
FIG. 1B is a view of an adjustable nose piece according to an embodiment of the present disclosure.
Figure 2:
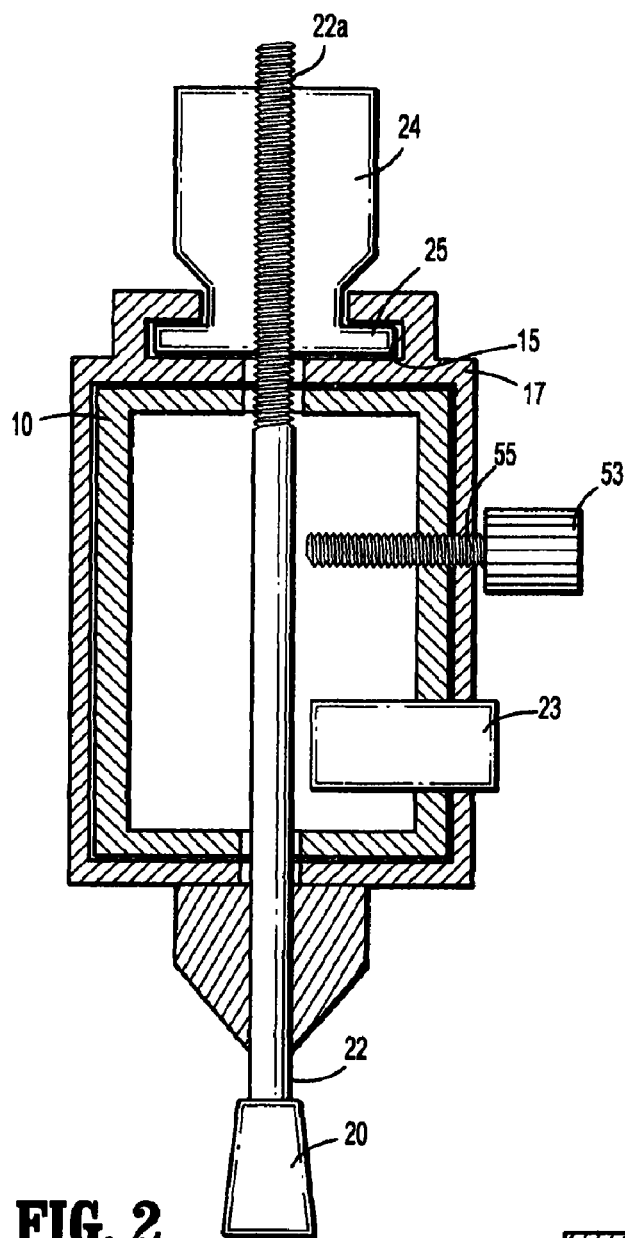
FIG. 2 is a cross-sectional view taken along lines 2-2 in FIG. 1.

Frame 10 also includes a pliable nose piece 20 attached via a vertically movable stem 22. According to an embodiment of the present disclosure, the nose piece is formed of a soft flexible material having one or more flex sensors embedded therein for providing information indicating the shape of the nose piece. The width of flexible nose piece 20 may also be adjustable. In this way, the splay of the inverted y shape of nose piece 20 is adjustable. As shown in FIG. 2, a distal end portion 22a of stem 22 is threaded and extends through an orifice in a center portion of frame 10 and through block 17. A knob 24 has a lower portion 25 that engages and sits within cupped portion 15 of block 17 for maintaining knob 24 in position, while allowing it to rotate about its axis. Knob 24 has a threaded bore through its center dimensioned to receive threaded distal end portion 22a of stem 22. Accordingly, stem 22 extends through frame 10 and block 17 and is threaded to knob 24. This allows nosepiece 20 to be raised or lowered by turning knob 24 clockwise or counter-clockwise as desired. A set screw 55 is connected to knob 53 and is threaded through block 17 and frame 10. Set screw 55 can be tightened so that its distal end presses against stem 22 for locking nosepiece 20 in the desired set position. According to an embodiment of the present disclosure, stem 22 includes a series of calibration marks (not shown) capable of being detected by a sensor 23 so that the relative vertical position of nosepiece 20 can be determined. According to another embodiment, nosepiece 20 can be replaced with various other styles of nosepieces so that an individual can obtain the best fit for their facial features. For example, according to an embodiment an adjustable nose piece unit 130 as shown in FIG. 1B may be provided. Bridge 134 is connected to stem 22 using any suitable type of attachment system such as screw, snap-on or clip-on, etc. Adjustable stems 136 have nose pads 138 attached thereto. Stems 136 are capable of moving horizontally (left and right) to allow a comfortable fit of the nosepiece on the wearer. Sensors may be provided for determining the position of each of the movable stems 136 and/or for determining which nosepiece is installed on the device.

Figure 3:
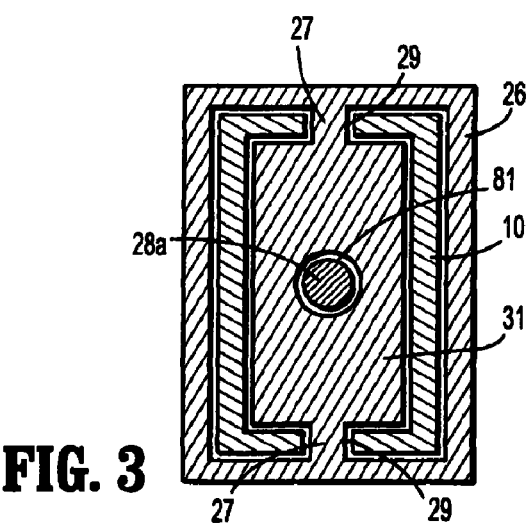
FIG. 3 is a cross-sectional view taken along lines 3-3 in FIG. 4.
Figure 4:
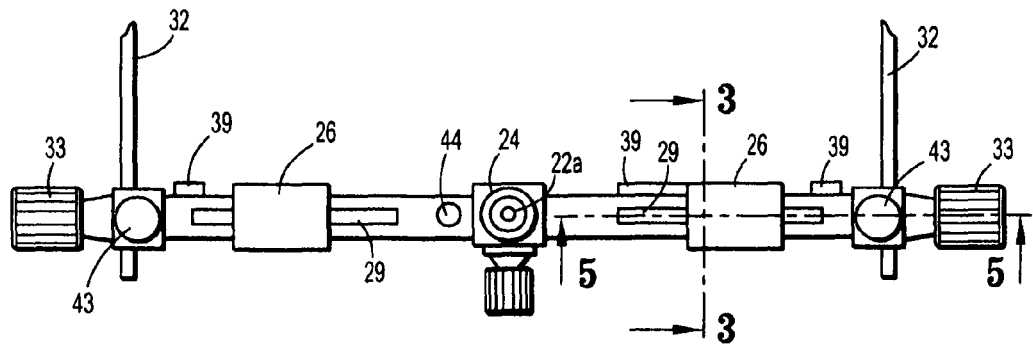
FIG. 4 is a top view of the eyeglass frame measuring system shown in FIG. 1.
Figure 5:
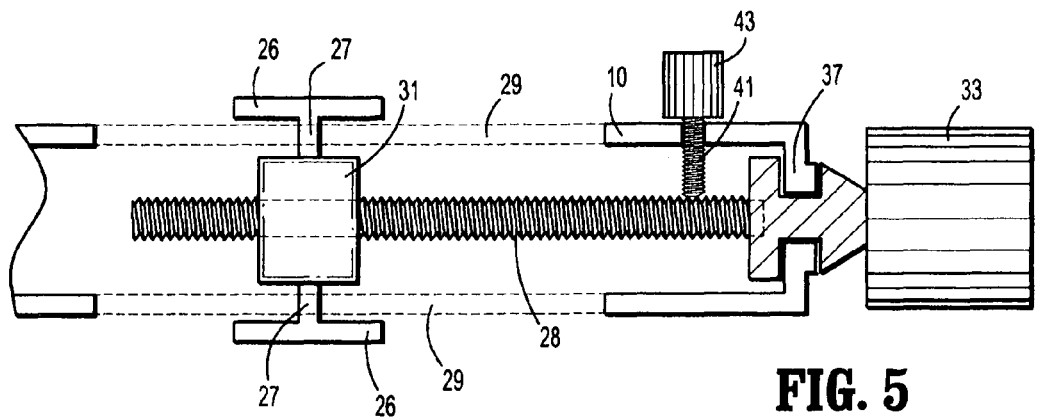
FIG. 5 is a cross-sectional view taken along lines 5-5 in FIG. 4.

Each rim 12 has an attachment arm 26 that slidably mounts to frame 10. As shown in FIGS. 3-5, frame 10 includes slots 29 provided along its top surface and corresponding slots along its lower surface. As shown, pins 27 extend from arm 26 through slots 29 in frame 10 and connect to nut 31 which has a threaded hole 81 through its center. A threaded stem 28 (FIG. 5) is mounted to a knob 33 and extends horizontally through frame 10 and engages threaded hole 81 in nut 31. A lower portion of knob 33 is substantially H-shaped in cross section as shown and is maintained in place by bearing surfaces 37. A similar arrangement is provided for each the right and left side rims 12. Rims 12 are thus movable left and right by turning knobs 33 in the clockwise or counter clockwise directions. This allows rims 12 to be moved so that each can be properly positioned over the patient's eyes.

Various types of detectors may be used for detecting the position of rims 12 relative to the center of the frame 10. For example, according to an embodiment of the present disclosure, each stem 28 may be provided with one or more calibration marks (not shown) capable of being detected by one or more optical sensors 39 (FIG. 4) so that the location of nut 31 can be monitored and the relative position of rims 12 with respect to the center of the frame 10 can be determined. Of course, other types of sensors may be utilized including, for example, rotary encoders, etc. A knob 43 includes a set screw 41 that is screwed into a threaded hole in frame 10 and which, when tightened, presses against stem 28 for temporarily locking rim 12 in position after adjustment has been made.

Figure 6A:
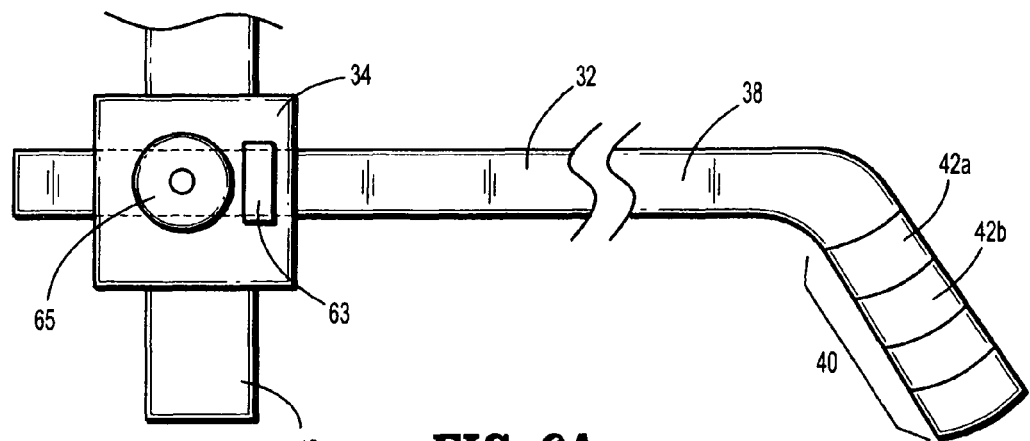
FIGS. 6A and 6B are side views for describing embodiments of the temple portions of the eyeglass frame measuring system shown in FIG. 1.

Measuring device 100 also includes adjustable temples 32 which slidingly engage supports 34 on the sides of rims 12. As shown in FIG. 1, supports 34 include slots 69 through which temples 32 (FIG. 6A) are slidably mounted. This allows temples 32 to slide in or out for making the length of temples 32 shorter or longer to provide a comfortable fit for the individual. At least an end portion 38 of temple 32 may be flexible so that it can be bent into a curved shape to mold around the patient's ear or can remain straight depending on the individual's preference. A distal end 40 of temple 32 may include telescoping sections 42a, 42b, etc. allowing a curved portion to be extended to any length desired by the patient. The flexibility of portion 38 and the inclusion of telescoping sections 42 allow the end portion of the temple 32 to remain straight or it can be formed, for example, into a C-shape as desired.

At least a portion of temples 32 may include calibration marks along their side. An optical sensor 63 is provided in support 34 for detecting the calibration marks and determining the temple's position so that the length of the temple between lens rim 12 and the distal end 40 of the temple 32 can be determined. A knob 65 having a set screw (not shown) is threaded in the side of support 34 so that temple 32 can be locked into position.

Figure 6B:
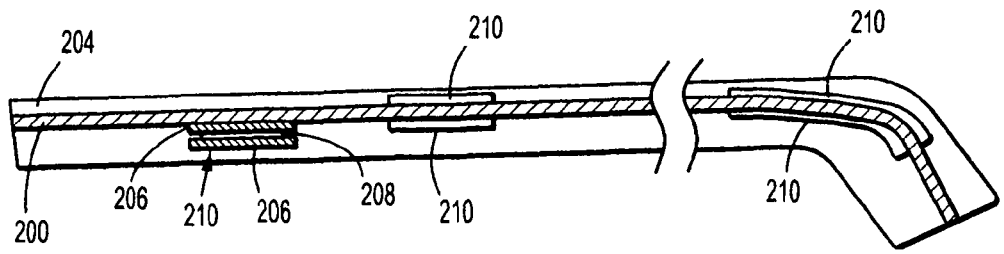

According to another embodiment of the present disclosure as shown in FIG. 6B, a flexible temple is provided that can be bent anywhere along its length so that it can be custom fit to the individual's head. According to this embodiment, the temples can be formed of a semi-rigid section of material 200 such as a flexible piece of wire encased in a conformable type of material 204 such as plastic/silicone, etc. Also encased in the material 204 are a plurality of flex sensors 210 capable of measuring an amount of bend made in the temples. Such flex sensors are well known in the art and can be formed by sandwiching a strip of plastic (e.g., from an ESD bag) 208 between pieces of copper foil 206. Each flex sensor will have a nominal resistance that will vary as the sensor bends. Once the temple has been shaped to the individual's liking, the resistances of the sensors can be read to determine the shape of the temple desired.

Figure 7:
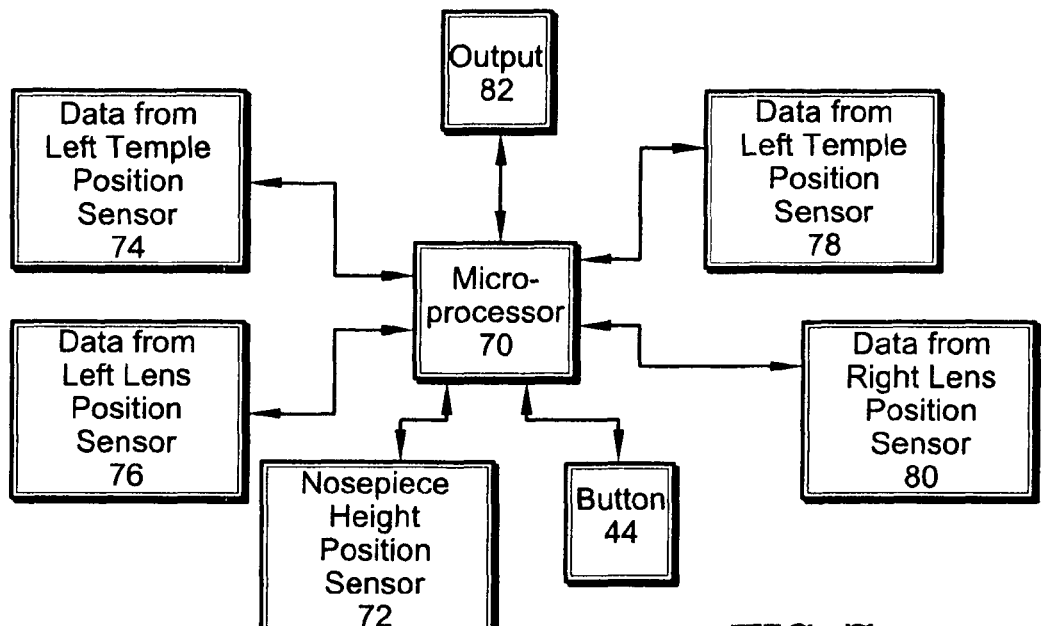
FIG. 7 is a block diagram for explaining the various types of data processed according to an embodiment of the present disclosure.

A microprocessor and power supply (e.g., battery) are located at any suitable position within frame 10, for example. When all adjustments have been made to the patient's liking, button 44 (FIG. 4) on frame 10 can be pressed one or more times to instruct the microprocessor to initiate upload of information to a computer. An example of the circuitry provided in frame 10 is shown in FIG. 7.

Pressing button 44 signals the processor 70 to begin reading sensor data (74, 78) from the left and right temple sensors 63, sensor data (76, 80) from the left and right lens rim sensors 39 and sensor data (72) from the nosepiece height sensor 23. Of course, if other sensors (flex sensors, centering line sensors, etc.) are provided, they are also read. The read data is then communicated to a computer in communication with processor 70 via output 82. The output 82 may be capable of outputting data using any suitable type of communication method including but not limited to wireless connection such as a Bluetooth connection or the frame 10 may include an output connection such as a mini USB port, for example, for connecting the microprocessor 70 directly to the computer via a wired connection. The read data can also be stored either locally on the users computer, for example or can be stored at a remote site accessible by the user and/or a dealer that custom fits eyeglass frames utilizing aspects of the present disclosure. In this way, anytime the user needs a new set of frames, re-ordering can be efficiently and easily done.

Figure 8:
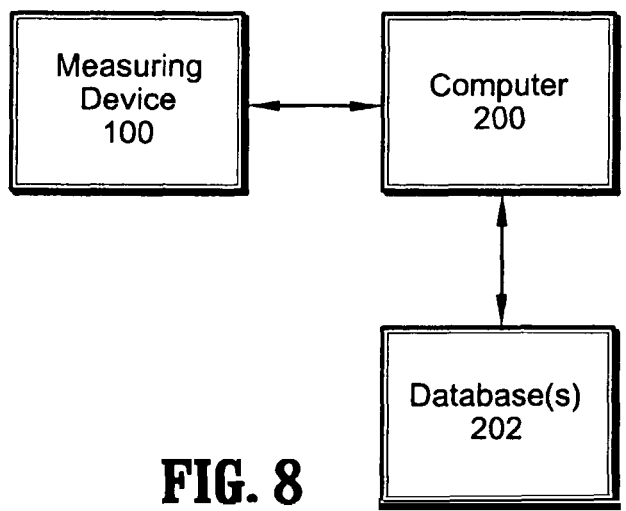
FIG. 8 is a block diagram for describing a computer/database system according to an embodiment of the present disclosure.

After the information is transferred from the measuring device 100 to the computer 200 (FIG. 8), the computer can be used to search one or more databases 202 for existing frames that meet each of the individual's measurements. If an exact match can not be found, one or more frames having measurements close to the individual's measurements can be shown to the patient. In the alternative, the individual can be shown any number of different types of frames that can be custom made for the individual using the individual's measurements. In this way, the patient can be outfitted with a set of eyeglasses that provide a comfortable and satisfying fit.

Although various embodiments of the present disclosure have been described as utilizing optical sensors, it will be appreciated that other types of sensors may also be used. For example, rotary encoders may be provided for monitoring rotation of the adjust knobs, thus allowing the position of the adjustable pieces to be readily calculated based on a number of rotations. Measuring device 100 may be incorporated into the adjustable trial frames used to test lenses as described in the background or may be a device separate from the trial frames and used solely to measure a patient for a properly fitted pair of eyeglass frames.

Measuring device 100 may be provided at a kiosk that allows individuals to use the device to obtain information for obtaining a proper fitting set of frames that can be ordered utilizing an input system also provided at the kiosk. The individual can adjust the measuring device 100 to fit their own face or can be assisted by another individual. For example, although most of the adjustments that can be made using measuring device 100 are readily performed by the individual, it may be helpful to obtain assistance from another individual for placement of centering lines 16H, 16V over the center of the pupil, since this can be difficult for an individual to do themselves.

Figure 9:
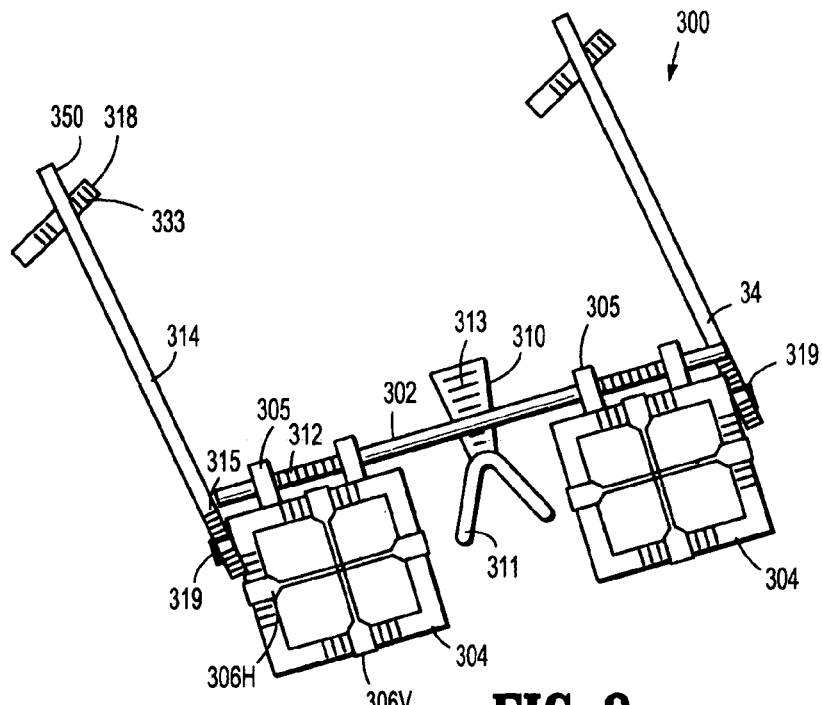
FIG. 9 is a disposable measuring device according to an embodiment of the present disclosure.

According to another embodiment of the present disclosure shown in FIG. 9, a measuring device 300 is formed of a disposable type of material such as paper or cardboard. According to this embodiment, the device includes a frame 302 and rim portions 304. Rim portions 304 include one or more loops 305 for slidably receiving frame 302 so that rim portions 304 can slide along frame 302. Rim portion 304 includes movable pupil markers 306H, 306V. Marker 306H slides up and down and marker 306V slides left and right along rim portion 304 for centering the patient's pupils. Rim portions 304 also include slots 319 through which temples 314 are slidably held. Also included is a nosepiece stem 310 that is slid between layers of the frame 302 so that nosepiece 311 can be adjusted up and down as desired. As shown, frame 302 includes reference marks 312 which indicate relative positions of the rims 304 with respect to the center of the frame 302. Nosepiece stem 310 also includes reference marks 313 for indicating the position of nosepiece 311 with respect to frame 302. An ear piece 318 slides between layers of temple 314 nesr distal end 350 and is adjustable up and down so that the length of ear piece 318 can be adjusted. Reference marks 333 are provided to indicate the position of ear piece 318. Reference marks 315 are provided along temple 314 for indicating the length of the temple 314 between ear piece 318 and rim portion 304 as the temple is slid through slot 319. The reference marks may be any suitable type of mark capable of being used to determine relative positions of the parts relative to one another and/or relative to the frame 302.

According to this embodiment, measuring device 300 can be made cost effectively and efficiently. The card board or paper measuring device 300 can be shipped as one piece of multilayer cardboard which has been perforated appropriately so that the pieces can be readily pushed out by the end user. The end user can then easily assemble the measuring device 300 and fit the device to their liking. After fitting, the user reads the reference marks and can provide that information to an eyeglass frame dealer via a phone call or internet connection, for example. The eyeglass frame dealer can then use that information to look up one or more appropriate frames from a database and provide images of those frames back to the user. The user can select an appropriate frame or select a type of frame that can be custom made to their size and liking.

Of course, various other types of designs and connections may be provided. For example, the temple may be formed from two pieces of cardboard instead of one piece. The two pieces can be mounted together in a fashion similar to a slide rule so that the length of the temple can be easily adjusted.

Figure 10:
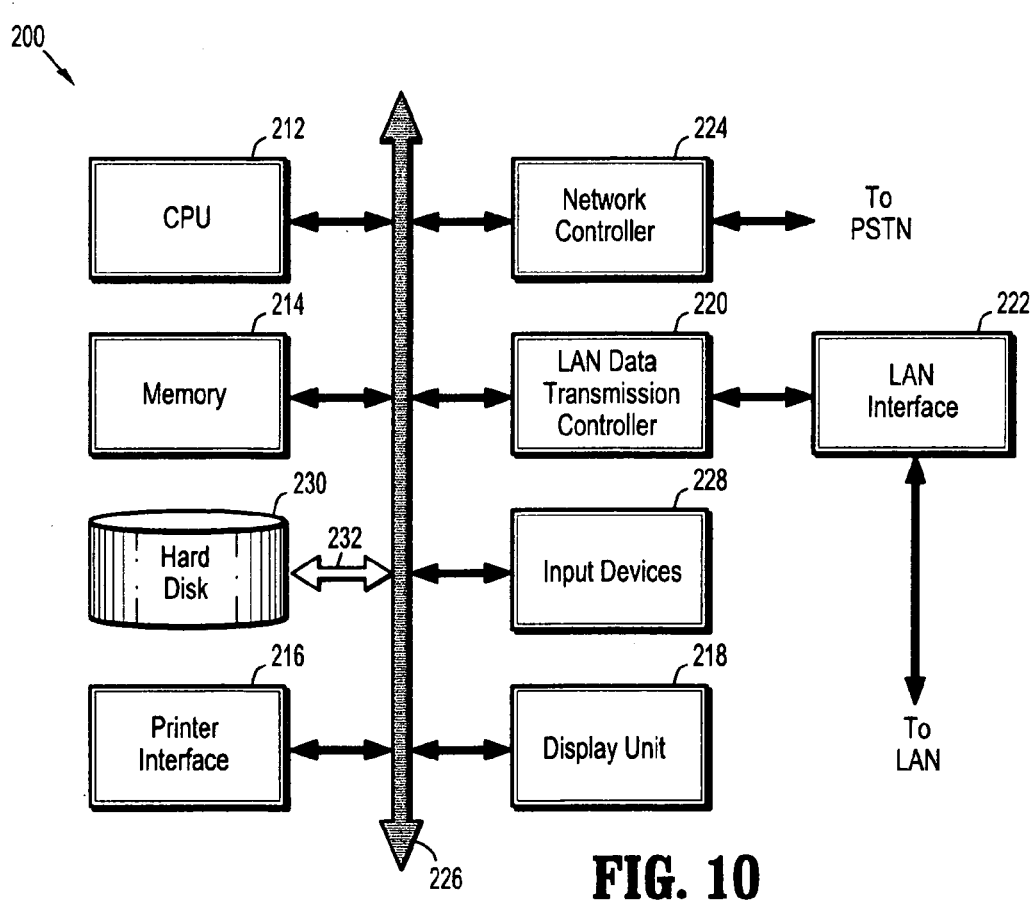
FIG. 10 is a block diagram of a computer that may be utilized for implementing aspects of the present disclosure.

FIG. 10 shows an example of a computer system 200 which may be used to receive information from eyeglass frame measuring system 100 and process and display information to a user. The computer system 200 may be implemented in the form of a software application running on a computer system, for example, a mainframe, personal computer (PC), handheld computer, server, smartphone, IPad, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 200 can include a central processing unit (CPU) 212, program and data storage devices 214, a printer interface 216, a display unit 218, a (LAN) local area network data transmission controller 220, a LAN interface 222, a network controller 224, an internal bus 226, and one or more input devices 228 (for example, a keyboard, mouse etc.). As shown, the system 200 may be connected to a database 230, via a link 232.

The computer system 200 is merely exemplary. The specific embodiments described herein are illustrative, computer system(s) as referred to herein may include(s) individual computers, servers, computing resources, networks, etc., and many variations can be introduced on these embodiments without departing from the spirit of the disclosure or from the scope of the appended claims.

Numerous additional modifications and variations of the present disclosure are possible in view of the above-teachings. It is therefore to be understood that within the scope of the appended claims, the present disclosure may be practiced other than as specifically described herein. For example, elements and/or features of different illustrative embodiments may be combined with each other and/or substituted for each other within the scope of this disclosure and appended claims.

What is claimed is:

1. A method for providing custom fit eyeglass frames, comprising:
   using a measurement system for taking a plurality of measurements directly from an individual's head to determine various measurements related to a fit of eyeglass frames to the individual's head;
   searching a database for eyeglass frames having dimensions the same as or similar to the measurements taken; and
   providing the individual with information relating to eyeglass frames found during the search of the database so as provide the individual with a selection of custom fit eyeglass frames from which to choose.

2. The method for providing custom fit eyeglass frames as recited in claim 1, wherein the measurement system comprises:
   a frame member;
   a pair of adjustable rims supported by the frame member, each rim including at least one indicator for locating a center of a wearer's pupil;
   an adjustable nosepiece supported by the frame member;
   a pair of adjustable temples each supported by one of the pair of rims;
   a plurality of sensors for detecting positions of the pair of adjustable rims, the pair of adjustable temples and the adjustable nosepiece; and
   an output for outputting sensor information from the plurality of sensors.

3. The method for providing custom fit eyeglass frames as recited in claim 1, wherein the searching step comprises using a computer system to query a database to find eyeglass frames having measurements within a predetermined range of the measurements taken.

4. The method for providing custom fit eyeglass frames as recited in claim 1, wherein the providing step comprises using the plurality of measurements taken to custom manufacture an eyeglass frame for the individual.

5. The method for providing custom fit eyeglass frames as recited in claim 1, wherein the measurement system in situ takes a plurality of measurements directly from the individual's head.

6. The method for providing custom fit eyeglass frames as recited in claim 1, wherein the measurements taken include information for determining at least one of positions of at least one of a pair of rims, length of at least one of a pair of adjustable temples and nosepiece position.

7. A method for providing custom fit eyeglass frames comprising:
   positioning an individual with respect to a measurement system and in situ taking a plurality of measurements directly from the individual's head to determine various measurements related to a fit of eyeglass frames to the individual's head;
   querying the individual as to a type of eyeglass frame they desire; and
   custom making a pair of eyeglass frames for the individual based on the plurality of measurements taken and the type of eyeglass frame the user desires.

8. The method for providing custom fit eyeglass frames, as recited in claim 7, wherein the plurality of measurements include information for determining at least one of positions of at least one of a pair of rims, length of at least one of a pair of adjustable temples and nosepiece position.

* * * * *